No. 770,764. PATENTED SEPT. 27, 1904.
A. MARIOLLE.
AUTOMATIC REVOLVING ADVERTISING AND SHOWING MACHINE.
APPLICATION FILED JUNE 20, 1903.
NO MODEL. 5 SHEETS—SHEET 1.
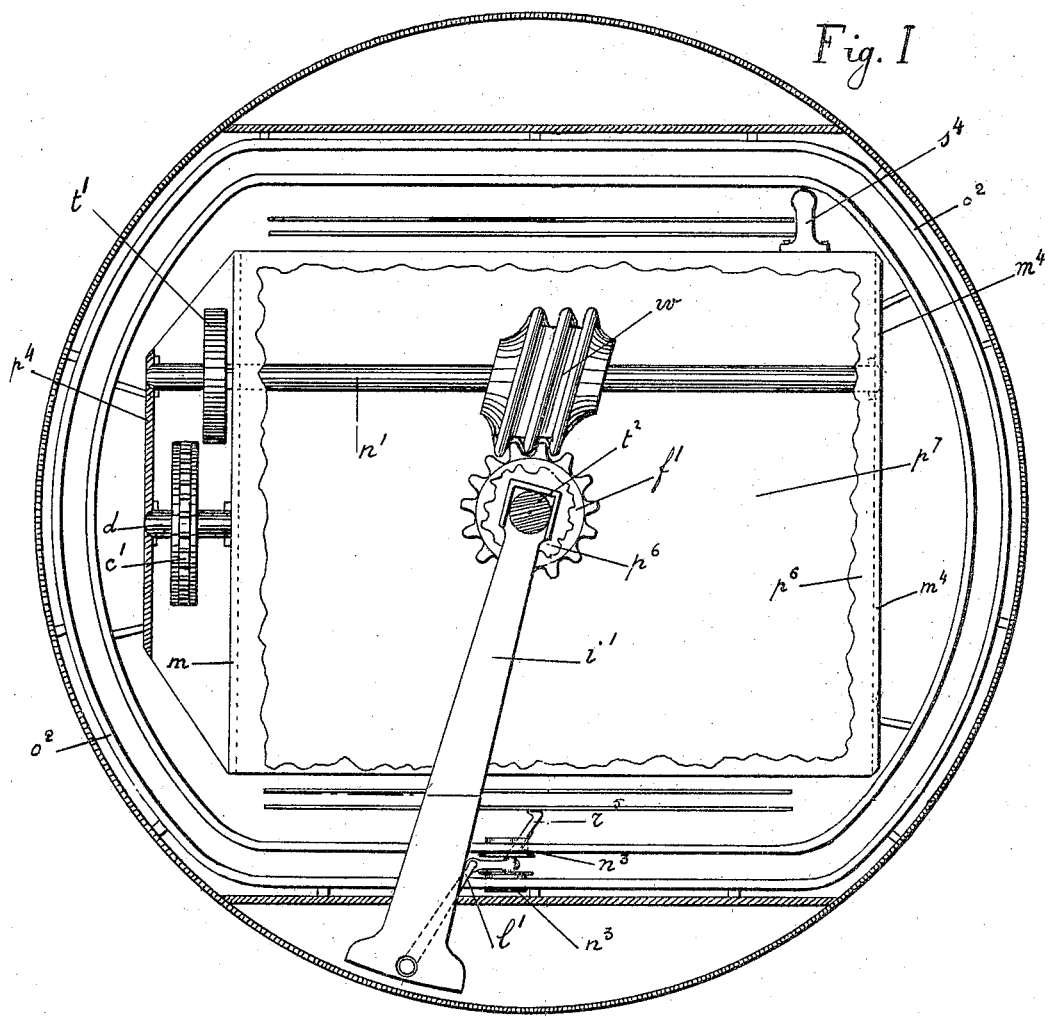
Fig. I
Witnesses
N. L. Britton
John K. Small.
Inventor
Auguste Mariolle

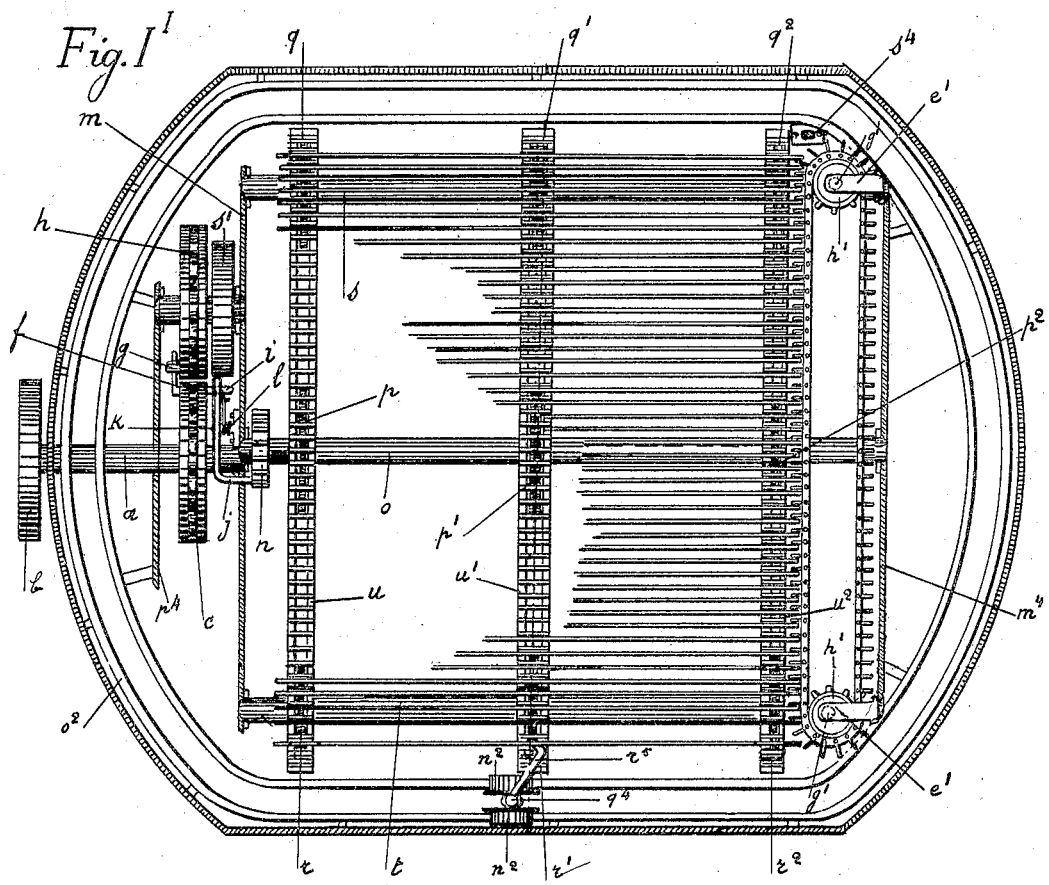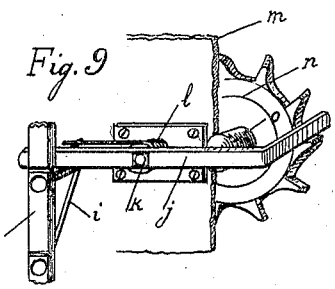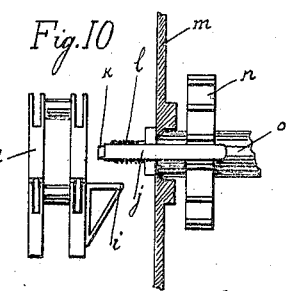

No. 770,764. PATENTED SEPT. 27, 1904.
A. MARIOLLE.
AUTOMATIC REVOLVING ADVERTISING AND SHOWING MACHINE.
APPLICATION FILED JUNE 20, 1903.
NO MODEL. 5 SHEETS—SHEET 3.

Witnesses
N. L. Britton
John C. Small.

Inventor
Auguste Mariolle

No. 770,764. PATENTED SEPT. 27, 1904.
A. MARIOLLE.
AUTOMATIC REVOLVING ADVERTISING AND SHOWING MACHINE.
APPLICATION FILED JUNE 20, 1903.
NO MODEL. 5 SHEETS—SHEET 4.

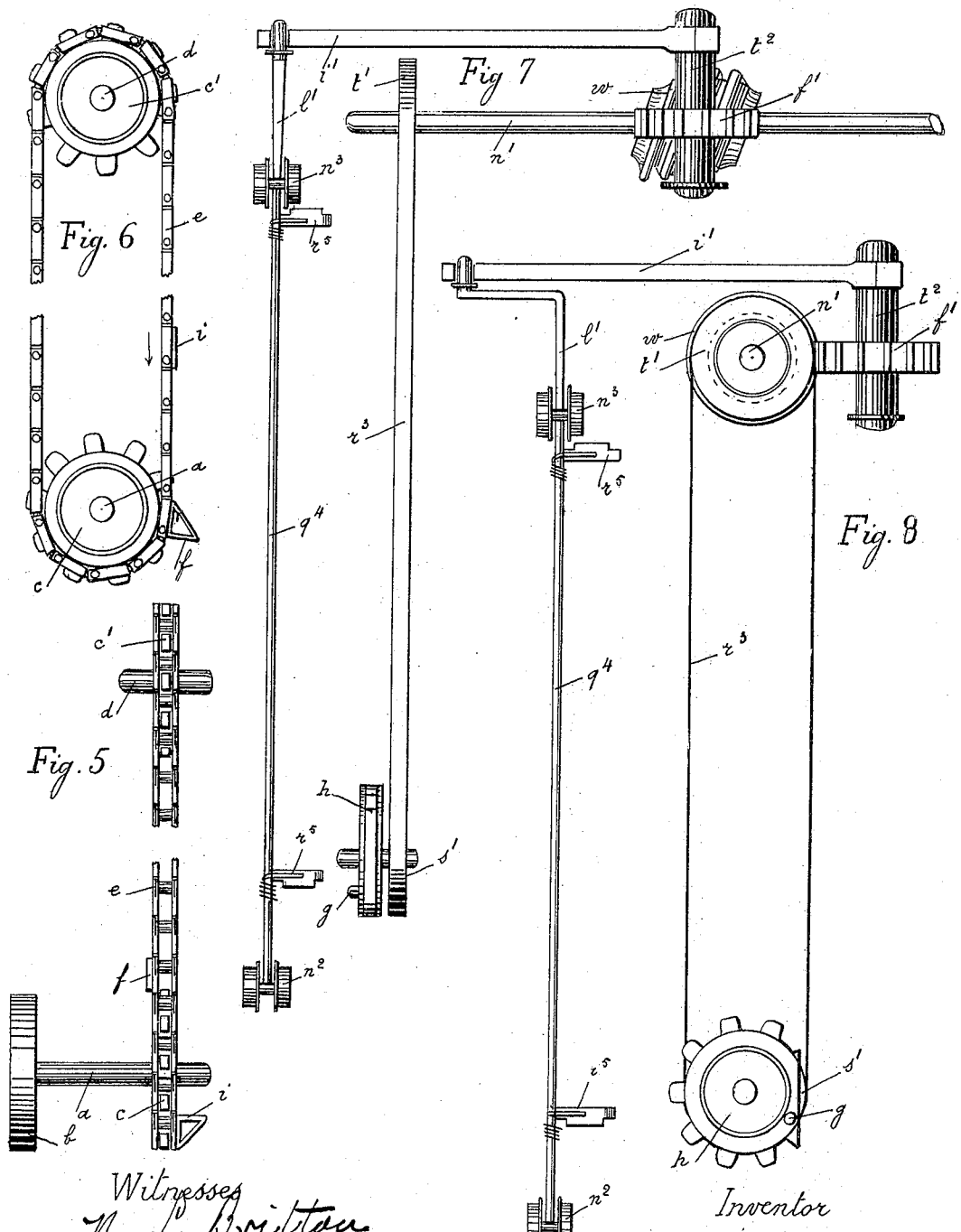

No. 770,764.

Patented September 27, 1904.

UNITED STATES PATENT OFFICE.

AUGUSTE MARIOLLE, OF NEW YORK, N. Y.

AUTOMATIC REVOLVING ADVERTISING AND SHOWING MACHINE.

SPECIFICATION forming part of Letters Patent No. 770,764, dated September 27, 1904.

Application filed June 20, 1903. Serial No. 162,378. (No model.)

*To all whom it may concern:*

Be it known that I, AUGUSTE MARIOLLE, a citizen of the French Republic, and a resident of New York, county and State of New York, have invented a new and useful Automatic Revolving Advertising and Showing Machine, of which the following is a specification.

My invention relates to improvements in automatic advertising and showing machines and the like in which a certain number of frames, made of any suitable flexible material and bearing pictures of any kind fastened thereto, are vertically supported on several endless chains having an automatic step-by-step movement, said frames being successively brought in front of the machine, when they are taken one after the other and driven around a casing cylindrical in top, half-cylindrical half-rectangular in low, part, glazed in front and rear, until they reach a point at the rear diametrically opposite to the starting-point, and where they are stopped. The two flattened parts are provided with glasses, allowing the pictures or advertisements to be seen through them, as are also two openings for the change of the frames.

Another object of this invention is to avoid any folding or rolling of the pictures to be shown, said pictures thus being never spoiled, and also to allow an exposure of the whole frames on both sides of the casing for a time, according to the speed of the intermittent driving movement. Moreover, this machine may be made of any size and in several forms, allowing the exhibition of a great quantity of frames and its effective use for very diverse purposes—toys, popular exhibitions, museums, schools, conferences, advertising business, &c.

These objects are attained by the mechanism described below, and illustrated in the accompanying drawings, in which—

Figure 2:
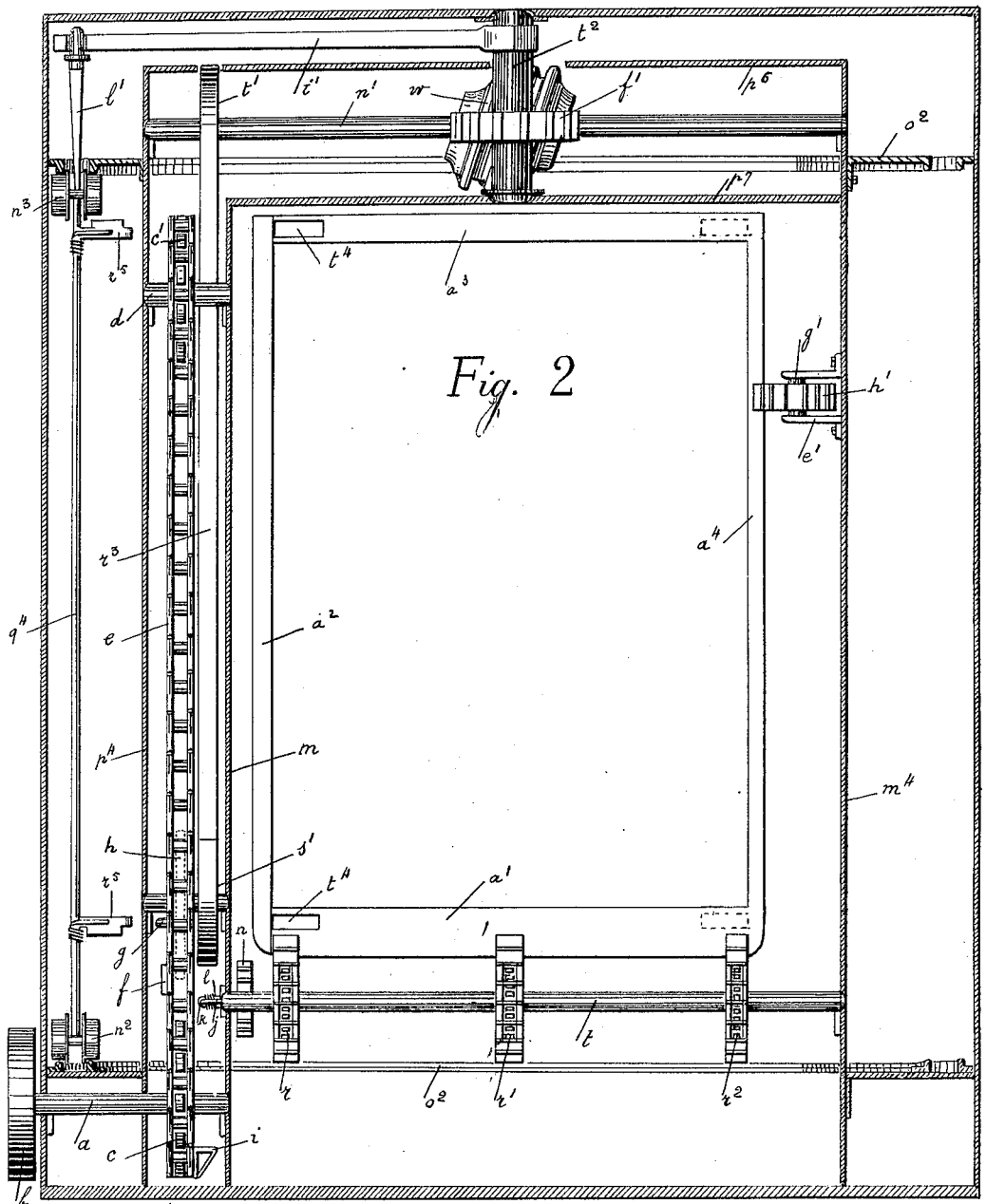
Figure 3:
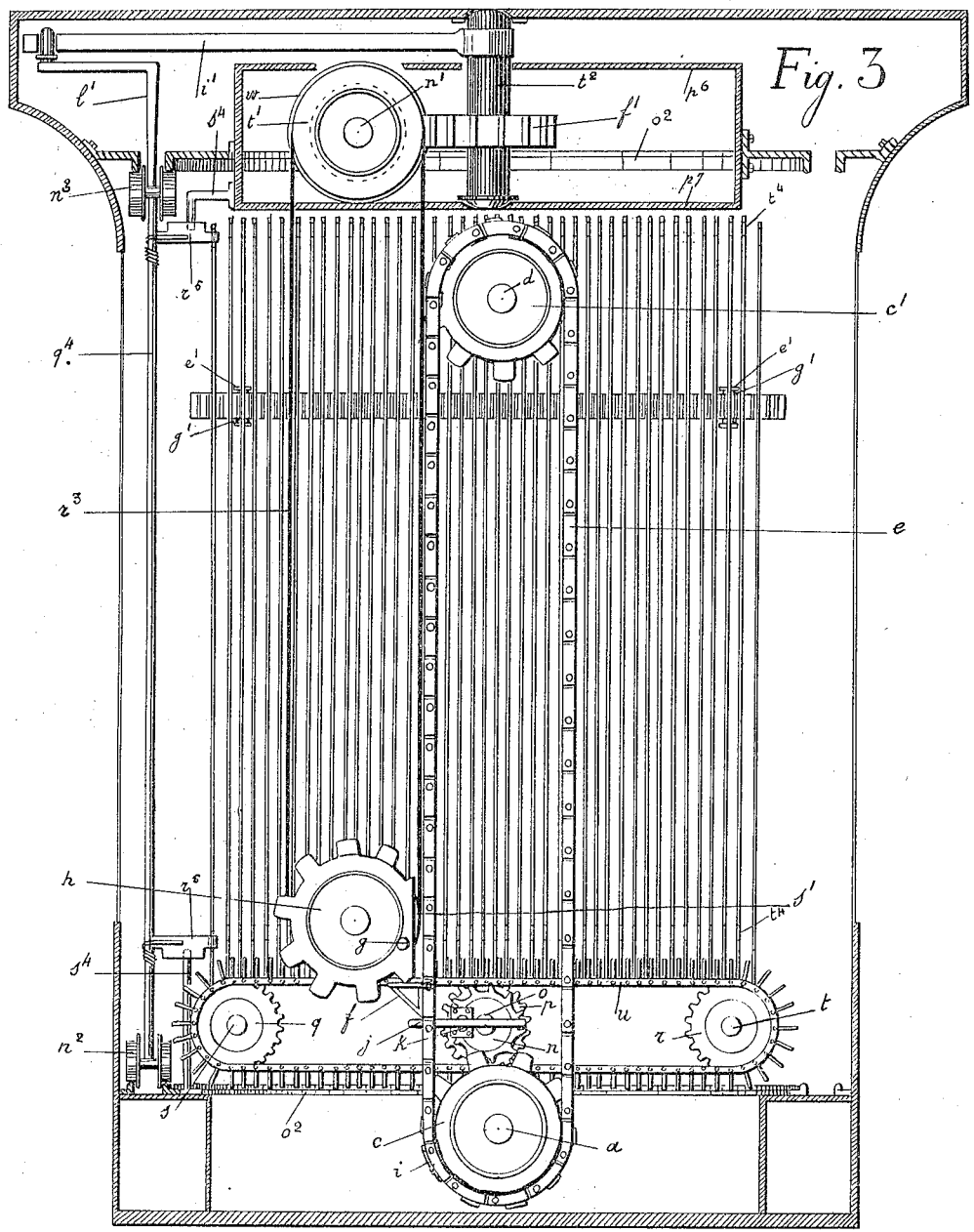

Figure 1 is a plan view of the upper part, the top removed and the first partition partially cut away, showing the upper part of the driving system. Fig. 1' is a plan view of the lower part, showing the operating connections, the supporting and changing devices, and the lower part of the driving system. Fig. 2 is a front elevation of the interior of the machine, the casing being shown in section. Fig. 3 is a side elevation of the interior of the machine, the casing being shown in section. In Figs. 2 and 3 the driving-arm is not shown as in Figs. 1 and 1' purposely to give a view of the driving mechanism in several positions. Fig. 4 is a detail view of a portion of the driving-chain. Fig. 5 is a front view of the operating system. Fig. 6 is a side view of the operating system. Fig. 7 is a front view of the driving system. Fig. 8 is a side view of the driving system. Fig. 9 is a front view of the device giving the step-by-step movement to the supporting and changing system. Fig. 10 is a side view of the same.

Referring to the accompanying drawings, the operating system comprises a power-shaft $a$, with a pulley $b$ mounted thereon at one end, said shaft being rotated either by crank or any suitable motor—such as dynamo, gas-engine, or clock-movement—according to the size and use. On the opposite end of the shaft $a$ a gear $c$ is mounted, which connects with a similar gear $c'$ on shaft $d$ by means of a chain $e$, the said chain $e$ being provided with a finger $f$, controlling the automatic movement of the driving system, and another finger, $i$, at right angles with the former to give the step-by-step movement of the supporting and changing device. When the machine is started, the operating system is given an uninterrupted movement; but the chain $e$ connects only once for each turn with the especially-constructed parts of the driving and supporting devices and according to its speed or length gives more or less time of exposure of the frames.

The supporting and changing device comprises three parallel shafts $o\ s\ t$, horizontally placed between the partitions $m$ and $m^4$, each of said shafts carrying, respectively, three similar gears mounted thereon and indicated by reference-letters $p\ p'\ p^2, q\ q'\ q^2, r\ r'\ r^2$. The said gears are respectively connected with the similar chains $u\ u'\ u^2$, which are provided with upwardly-projecting lugs or fingers, between which the lower edges of the frames will be inserted. The shaft $o$ has a ratchet-wheel $n$, especially constructed to be engaged by the resilient lever $j$, connecting with the operating system. Every time the lever $j$, pivoted at $k$ to a stud $l$, secured to the partition $m$, is operated by the finger $i$ of the chain $e$ a slight movement is given to the ratchet-wheel $n$, and consequently to the frame supporting and carrying chains $u$ $u'$ $u^2$, through the shaft $o$ and gears $p$ $p'$ $p^2$ mounted thereon. By this action the whole device has advanced a tooth.

On the side of the partition $m^4$ are secured horizontal lugs $e'$. Journaled therein are shafts $g'$, carrying horizontal cog-wheels $h'$ $h'$, loosely mounted thereon, said wheels driving a chain similar to those of the supporting system and whose object is the proper spacing and maintaining of the frames.

The driving system comprises a partially-cut-away gear $h$, receiving motion from the operating system. A pin $g$ is secured to the face of said gear and perpendicularly thereto. Every time the finger $f$ of the chain $e$ acts upon the pin $g$ the teeth of the gear $h$ are thrown into engagement with the chain $e$ and a whole turn is given to the gear $h$, after which the motion is stopped on account of the cut-away portion of the gear freeing the chain $e$. This movement is transmitted by a belt $r^3$, through a pulley or wheel $s'$ of same diameter and mounted on same shaft as gear $h$, to a similar pulley $t'$, mounted on shaft $n'$ at the upper part of the casing, said shaft $n'$ being journaled in the partition $p^4$ $m^4$ and provided in its middle portion with a worm $w$, transmitting the said motion to a horizontal pinion $f'$, secured to a vertical shaft $t^2$, actuating a horizontal arm $i''$, which carries a downwardly-projecting device $l'$, loosely fitted into a hole at the end of said arm $i''$. The shaft $t^2$ passes through the partition $p^6$ and is mounted on partition $p^7$ and top. The device $l'$, actuated by the arm $i''$, is intended to catch and drive the frames around the casing. To this end two tracks $o^2$ $o^2$ are provided around the casing, secured on walls and partitions and passing parallelly to the frames. Upon said tracks run two pairs of wheels $n^2$ $n^2$, $n^3$ $n^3$, connected at their axles by a vertical rod $q^4$, the axle of the upper pair being fastened to the loosely-fitted device $l'$, above referred to. Secured to the rod $q^4$ and near its two ends are two hook-shaped catches $r^5$ $r^5$, provided with springs normally pushing them forward against the frames when passing in front of them and by reason of such pressure entering the holes $t^4$ $t^4$ at the upper and lower part of the frames when they meet them. By this combination and when the driving system is in motion the frame in the holes of which the hooks are located is taken and then driven away by the carriage running around the casing and brought to a point at the rear diametrically opposite to the starting-point, where the hooks striking the abutments $s^4$ $s^4$, placed in their way, are thrown out of engagement with the frame, leaving the latter resting on the supporting-chains $u$ $u'$ $u^2$, while the carriage, proceeding in its movement, comes in front, puts the hooks in engagement with another frame, and stops at this moment, waiting another impulse of the operating system.

As indicated by the above description, the lever $j$, controlling the step-by-step movement of the supporting and changing device, is to be struck by the finger $i$ of the chain $e$ when the rear part of the frame in motion quits the front side. Therefore another frame is put in front and free place is ready in rear side to receive the said frame in motion. When the mechanism is at rest, the hooks are located in the holes $t^4$ $t^4$ of the frame, which is the initial point of the circular movement of the arm $i'$.

The abutments $s^4$ $s^4$, as seen in Fig. 3, are simply iron pieces firmly fixed to the partitions and located in the way of the hooks, as seen in Figs. 1, 1', between the tracks and the supporting device just opposite to the point where the frame drawn by the hooks must be stopped. The hooks meeting the abutments in their way act upon their springs and in this movement leave the frame in proper place. Compelled by the said springs the hooks take again their former position when they have turned after the abutments.

The frames, as seen in Fig. 2, consist of four thin strips of flexible material $a'$ $a^2$ $a^3$ $a^4$, maintaining a piece of canvas over which the pictures or advertising matters are to be pasted or fastened. These matters must be pasted or fastened over the two sides, the machine showing them alternatively. In the lower and upper strips are two holes $t^4$ $t^4$ in one side and two similar holes in the other side. These holes are of use alternately, the hooks catching the frame only in the position shown in Fig. 3 at the openings $t^4$ $t^4$.

The fingers of the supporting-chains $u$ $u'$ $u^2$ may be constructed very lightly, as they are intended only for the proper spacing of the frames. Chains well undulated may be sufficient.

From the foregoing the operation of the machine is as follows: The chain $e$ being actuated by the gear $c$ acts, by means of its finger $f$, upon the partially-cut-away gear $h$, which is given a whole turn, transmitting the movement to the pulley $t'$ and shaft $n'$ through the belt $r^3$, and consequently drives the worm $w$, which engages the pinion $f'$ on shaft $t^2$. At the same time the arm $i''$ turns, pulling its member $l'$. The frame in the holes of which the hooks are engaged is then driven around the casing until the hooks meeting the abutments $s^4$ leave the frame at the rear. During this operation and in proper time the supporting device has advanced a tooth, substantially as set forth, and brought another frame in front. The hooks proceeding on their way to complete a revolution come again in front and enter the holes of another frame, which will be driven away in its time in the same manner.

Various forms and dispositions may be given to this machine and the mechanism may be placed at either side, all at the top or all at the bottom, according to the use or size, and the same devices, although located in different places, will allow of same or more exposures and changes of the frames without departing from the spirit of the invention.

Having described my invention and in what manner it operates, what I claim as new, and desire to secure by Letters Patent, is—

1. In an automatic advertising and showing machine, the combination of a moving chain, a projecting finger $i$, secured thereto, and intended to start the movement of other apparatus at each turn of the said chain; with a ratchet-wheel giving a step-by-step movement, substantially as described, to a mechanism composed of several chains actuated in unison by gears mounted on horizontal parallel shafts and supporting a certain number of frames made of canvas surrounded by any suitable flexible material and provided with holes allowing their being grasped, substantially as set forth.

2. In an automatic advertising and showing machine, the combination of a moving chain, a projecting finger $f$, secured thereto, and intended to start the movement of other apparatus at each turn of the said chain; with a partially-cut-away gear, intended, according to its described construction, to make only one rotation with each turn of the moving chain, when struck by the finger $f$ of the said chain, this gear giving motion to the whole driving mechanism except when presenting its cut-away portion to the chain substantially as set forth.

3. In an automatic advertising and showing machine, the combination of a moving chain, a finger $f$ secured thereto, a partially-cut-away gear operated by said chain, and intended, according to its described construction, to make only one rotation with each turn of the moving chain, when struck by the finger $f$ of the said chain, this gear giving motion to the whole driving mechanism except when presenting its cut-away portion to the chain; a horizontal shaft, a worm thereon, and a mechanism, as described, transmitting the said motion to said horizontal shaft.

4. In an automatic advertising and showing machine, the combination of a moving chain, a finger $f$ secured thereto, a partially-cut-away gear operated by said chain, and intended to make only one rotation with each turn of the moving chain, when struck by the finger $f$ of the said chain, this gear giving motion to the whole driving mechanism except when presenting its cut-away portion to the chain, a horizontal shaft, a worm thereon; a mechanism transmitting the said motion to said horizontal shaft; a vertical shaft, a pinion thereon meshing with the said worm; and an arm driven by the said vertical shaft, substantially as set forth.

5. In an automatic advertising and showing machine, the combination of a supporting system, a moving chain, a finger $f$ secured thereto, a partially-cut-away gear intended to make only one rotation with each turn of the moving chain, when struck by the finger $f$ of the said chain, this gear giving motion to the whole mechanism except when presenting its cut-away portion to the chain, a horizontal shaft, a worm thereon; a mechanism transmitting the said motion to said horizontal shaft; a vertical shaft, a pinion thereon meshing with the said worm; an arm driven by the said vertical shaft; with a downwardly-projecting device loosely fitted in a hole of the said arm; a rod, fastened to the downwardly-projecting device, two parallelly-superposed tracks, connecting wheels running as described on said tracks; and two resilient hook-shaped devices, located on the said rod and intended to catch the frame waiting at the front side upon the supporting system and carry the said frame to its proper second position in rear side, where the said frame is stopped in a diametrically opposite point, substantially as set forth.

In testimony whereof I have signed my name to this specification in the presence of two subscribing witnesses.

AUGUSTE MARIOLLE.

Witnesses:
N. L. BRITTAN,
JOHN K. SMALL.